United States Patent [19]

Mohammed et al.

[11] Patent Number: 5,507,900

[45] Date of Patent: Apr. 16, 1996

[54] CONTINUOUS POLYMER AND FABRIC COMPOSITE AND METHOD

[75] Inventors: Abdeally Mohammed, Houston; Lyndell K. Wynne, Kingwood, both of Tex.

[73] Assignee: Reef Industries, Inc., Houston, Tex.

[21] Appl. No.: 443,484

[22] Filed: May 18, 1995

Related U.S. Application Data

[62] Division of Ser. No. 200,166, Feb. 18, 1994.

[51] Int. Cl.$^6$ ........................................ B31F 5/00
[52] U.S. Cl. .................. 156/157; 156/304.1; 156/304.3; 156/304.4; 156/304.5; 156/304.6; 428/57; 428/60; 428/192; 428/193
[58] Field of Search .................. 428/57, 60, 192, 428/193; 156/157, 304.1, 304.3, 304.4, 304.5, 304.6

[56] References Cited

U.S. PATENT DOCUMENTS

| | | | |
|---|---|---|---|
| 3,449,186 | 6/1969 | Rano | 428/60 |
| 3,770,555 | 11/1973 | Gladstone et al. | 428/60 |
| 3,870,557 | 3/1975 | Fink et al. | |
| 4,348,445 | 9/1982 | Craig | 428/138 |
| 4,485,137 | 11/1984 | White | 428/57 |
| 4,524,093 | 6/1985 | Devry | 427/389.9 |
| 4,624,604 | 11/1986 | Wagner et al. | 405/128 |
| 4,629,651 | 12/1986 | Davis | 418/257 |
| 4,683,165 | 7/1987 | Lindemann et al. | 428/290 |
| 4,749,306 | 6/1988 | Demeny et al. | 405/45 |
| 4,787,772 | 11/1988 | Wagner | 405/53 |
| 4,797,964 | 1/1989 | Ritter et al. | 8/115.6 |
| 4,800,119 | 1/1989 | Kolar | 428/283 |
| 4,815,892 | 3/1989 | Martin | 405/45 |
| 4,894,280 | 1/1990 | Guthrie et al. | 428/224 |
| 4,960,349 | 10/1990 | Willibey et al. | 405/262 |
| 5,056,960 | 10/1991 | Marienfeld | 450/270 |
| 5,091,247 | 2/1992 | Willibey et al. | |
| 5,132,163 | 7/1992 | Leaderman et al. | 428/253 |
| 5,137,393 | 8/1992 | Fuhr et al. | 405/129 |
| 5,141,362 | 8/1992 | Kügler | 405/128 |
| 5,199,825 | 4/1993 | Travis | 405/296 |
| 5,206,067 | 4/1993 | Bonzo | 428/119 |
| 5,320,698 | 6/1994 | Fournier et al. | 156/159 |

FOREIGN PATENT DOCUMENTS

| | | |
|---|---|---|
| 1310892 | 3/1992 | Australia. |
| 87 13 653.8 | 1/1987 | Germany. |
| 94 00 650.4 | 4/1994 | Germany. |
| B32B3108 | 6/1990 | WIPO. |

OTHER PUBLICATIONS

Casper, M. S., "Nonwoven Textiles", Noyes Data Corporation, Park Ridge, New Jersey, 1975, pp. 269–271.
Giroud, J. P., "Design of Geotextiles Associated with Geomembranes", Second International Conference on Geotextiles, Las Vegas, U.S.A., pp. 37–41.
Giroud, J. P., "Designing with Geotextiles", pp. 257–272.
Giroud, J. P., "Geomembrane Protection", pp. 99–104.
Motan, E. S., Reed, L. S. and Lundell, C. M., "Geomembrane Protection by Nonwoven Geotextiles", Geosynthetics '93–Vancouver, Canada, pp. 887–900.
Paulson, J. N. and Parker, L. W., "Multiple Geotextile Layers Used for Geomembrane Support in a Landfill: The Marion County (Florida) Landfill Project", Geosynthetics '93–Vancouver, Canada, pp. 1287–1300.
Polyfelt, "Geotextiles for Waste Containment Systems".
Polyfelt, "Geomembrane Containments".
Poly–Flex, "Polyethylene Geomembranes for Pollution Abatement and Water Conservation".
Wong, C. L. Y., and Wijewickreme, D., "HDPE & VLDPE Geomembrane Survivability", Geosynthetics '93–Vancouver, Canada, pp. 901–914.
PCT Search Report mailed Jun. 21, 1995.

*Primary Examiner*—James J. Bell
*Attorney, Agent, or Firm*—Fish & Richardson

[57] ABSTRACT

A method for making a polymer and fabric sheet composite has been developed that can provide large surface area coverage. The fabric is backed by a polymer sheet with a strip along the edge not backed by the fabric. This strip of polymer can be used to attach to another sheet of polymer and fabric composite by sealing the polymer edge of the first sheet to the polymer layer of the second sheet.

6 Claims, 4 Drawing Sheets

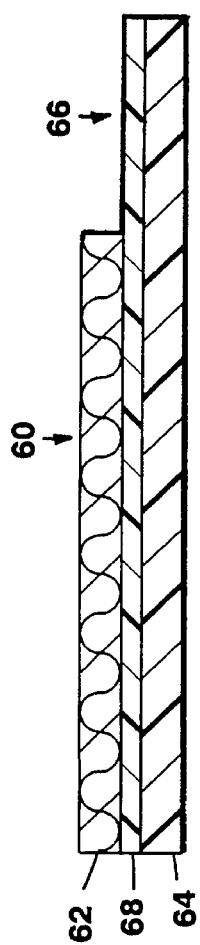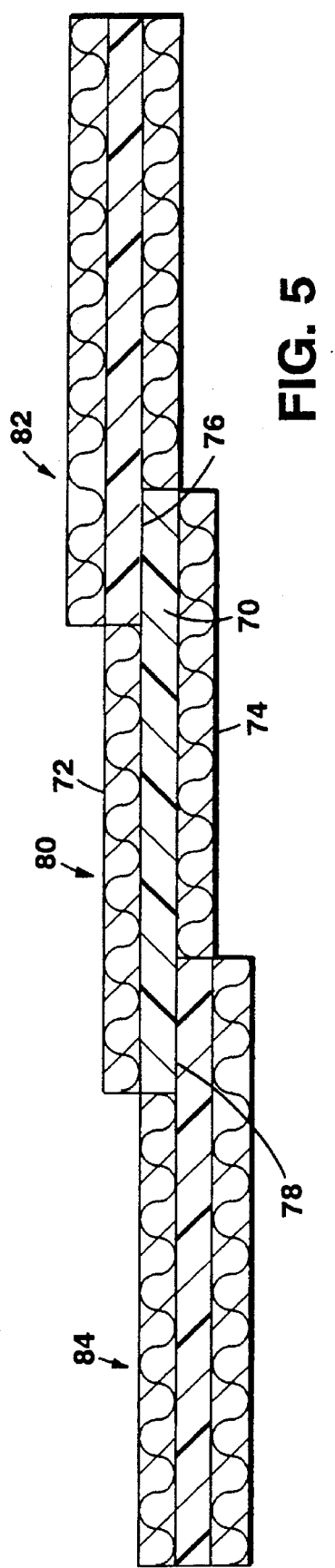

CONTINUOUS POLYMER AND FABRIC COMPOSITE AND METHOD

This is a divisional of copending application Ser. No. 08/200,166, filed Feb. 18, 1994.

BACKGROUND OF THE INVENTION

Impermeable, strong sheeting used for covers or protective barriers are necessary in a number of applications. Furthermore, continuous impermeable coverings for large areas or surfaces are particularly desirable in environmental, mining, and other projects relating to outdoor terrain.

Part of the difficulty involved in preparing an impermeable, strong covering involves the manufacture of a sheeting that can be augmented during the manufacturing process and further, easily fabricated to produce a continuous sheet of substantial size. The large size continuous sheets are desirable for use as barriers of excavation sites as well as top covers over excavation for containment. Significant outdoor uses include barriers used with ponds, land fills, waste disposal and hazardous waste management. In addition, continuous sheeting is used in mining operation to prevent leaching of potential dangerous chemicals used in refining. Other applications are in beachfront protection from oil spills, waterproof membranes and membrane stabilizers for road construction.

In these applications it is beneficial to have at least part of the continuous sheeting in contact with a textile layer. Typically, lengths of polymer sheets are laid over lengths of textiles. In the environmental applications the polymer sheets used as part of the barrier are often called geomembranes while the textile layer is called a geotextile.

A geomembrane can be plastic or rubber sheeting reinforced plastic or rubber sheeting of sufficient thickness or biaxially oriented plastic sheeting. Geomembranes, depending on the application, typically range in thickness from 5 mil–100 mil. The plastic sheeting alone in most instances is either too thin or sometimes too thick and rigid to provide effective protection against various mechanical stresses acting on the material. Problems can also occur from the accumulation of a liquid, such as ground water, vapor condensation or springs, or gas from organic degradation or air trapped in the soil underneath the plastic sheeting, causing it to burst. To prevent damage to the geomembranes, a geotextile is laid over the substrate or soil and the geomembrane is laid over the geotextile to protect and reinforce the geomembrane from damage due to rocks and sharp objects. The geotextile due to its porosity aids in the efficient drainage of liquids and gases, preventing costly membrane failure. The first reported use of such a combined arrangement was in 1971, although geomembranes and geotextiles reportedly were used separately starting in the 1940 and 1950's. These systems are now mandatory by governmental regulations for hazardous and nonhazardous waste landfills, waste piles, and other environmental applications. These systems perform better and have replaced the conventional clay/protective layers.

The geotextiles are made of nonwoven or woven material including fabrics, synthetic and natural fibers. Nonwoven textiles preferred for geotextile application are staple needle punched, continuous needle punched, spunbonded, melt blown, dry laid, wet laid, spunlaced, spunweb and composite structures. Installation is normally carried out on site. The ground is sufficiently conditioned before the installation of the geotextile. First, rolls of geotextile are laid over the area to be covered. Coverage is achieved by overlapping the rolls of geotextile with a 1–3 feet overlap, sewing the rolls together, or bonding with an adhesive at the site. The geomembrane or plastic sheeting is then rolled over the geotextile. The plastic sheeting can be sealed by field fabrication techniques, including extrusion fillet welding, extrosion flat welding, hot wedge fusion, hot air seaming and ultrasonic seaming. In these installations most of the work is carried out at the actual site where working conditions may be unreliable and further require a significant investment of time and labor.

The sealing techniques available on site can produce uneven seals resulting in a defective bond between layers of geomembrane. The seal may not be good enough to prevent leaks at the seam. Also, since in many cases the geotextile and geomembrane are simply laid on top of one another without any joinder between the two layers slippage can result particularly on a sloped area exposing one of the layers or ground beneath to moisture, hazardous waste or other type of leachate. Friction treatment on surfaces of the geomembrane or geotextile to prevent slippage have been proposed as shown in U.S. Pat. Nos. 5,056,960 and 5,137,393 issued to Marienfeld on Oct. 15, 1991 and Fuhr et al. on Aug. 11, 1992, respectively.

Hence, an improved system consisting of a fabric and polymer sheeting, offering the advantages of a simple fabrication technique, superior performance, ease of installation, versatility and economics is desirable.

SUMMARY OF THE INVENTION

The new polymer and fabric composite and method for manufacturing provides a simplified solution to the existing problems of a cost effective, reliable product for use with small or large areas that need to be protected from moisture, hazardous waste, runoff or even solid contamination deposition. A leak proof continuous composite can be fabricated to specifications covering a surface area of 40,000 ft$^2$ or more prior to field installation.

The polymer and fabric composite comprises at least two polymer sheets with fabric attached covering substantially one side of the polymer sheets. In one embodiment, one of the sheets has a strip of polymer along at least one edge not backed by the fabric. This edge forms a lip that can be attached to another polymer sheet to form a strong bond between the two polymer layers. In the preferred embodiment multiple polymer sheets are prepared with the fabric backing covering substantially one side leaving a lip of polymer for attachment along an edge of each of the polymer sheets. In the preferred embodiment, the polymer lip of one fabric backed polymer sheet is attached to an edge of a similarly prepared second sheet opposite to the polymer lip of the second sheet and attached to the reverse side to the fabric backing of the second sheet so that the polymer layers are facing each other. In the preferred embodiment the polymer layers are heat sealed although any other means of attachment known to those skilled in the art could be used. Additional similarly prepared polymer sheets with a polymer lip and fabric backing can be attached to manufacture the desired size of continuous composite.

The fabric backed polymer sheets can be made in any configuration desired for the field application. The lip used for attachment can be on one or more edges, and one sheet can be attached to several other sheets. Polymer sheets are typically prepared in rolls. The fabric backing can be laminated to the back of the polymer roll. The rolls with lips along one edge can be attached to each other as described above in seriatim to provide a continuous product composite with the length and width dimensions as needed. The continuous composite can be cut at the site to conform with any curves or angles.

In some cases there may be a need to have a fabric backing on both sides of the polymer sheet. In an alternative embodiment, the composite is prepared with a fabric backing covering substantially one side of the polymer sheet leaving a strip along one edge not backed by the fabric, and a fabric backing on the reverse side of the sheet substantially covering the reverse side leaving a strip of polymer without a fabric backing. A second composite sheet is prepared in the same manner. In the preferred alternative embodiment, the first and second polymer sheets are aligned so that the polymer strips face each other and are sealed to form a continuous composite.

In another embodiment the fabric backing covers one side of the polymer sheet but a strip of fabric along one edge is not attached. When the polymer lip is attached to another sheet, the fabric layer is placed so it does not interfere with the attachment between the two polymer sheets. The fabric layer may overlap the fabric backing of the adjacent sheet.

The polymer used in the invention can be made from any type of material that can be formed into sheets as described herein. It is not intended to limit the type of polymer to any material and polymer sheets can be customized as to materials and thickness as desired. Polymers with chemical resistant properties may be desired for certain applications involving hazardous waste and mining operations. The thickness of the polymer sheet is generally between about 5 to about 100 mils. Some suggested materials are olefinic hydrocarbon based plastics and elastomers; substituted ethylenic based polymers; heterochain oxygen, nitrogen and sulfur substitutes polymers; thermosetting resins and mixtures of polymers. The polymer sheets can be made of multi-ply laminates of two or more layers. The layers may be of the same or different polymers. In addition, a reinforcing scrim may be included as a layer of the composite or a layer of a multi-ply polymer sheet.

The fabric can be any suitable type of textile. The fabric may be a woven or nonwoven textile. The fiber used in the fabric may be one of many synthetic or naturally occurring fibers or mixtures thereof.

The continuous composite of the present invention is used in environmental applications calling for a geomembrane and geotextile combination. The geomembrane is a polymer sheet that is resistant to chemicals and significantly impermeable to liquids and gas and is of sufficient thickness to provide a strong seal when the lips are overlaid and sealed in attaching one sheet of geomembrane to another. The geotextile is used as a fabric backing as described herein and is a woven or nonwoven fabric.

BRIEF DESCRIPTION OF THE DRAWINGS

FIG. 4 is a schematic of the fabric backed polymer sheet with the polymer lip.

FIG. 5 is a schematic of an alternative embodiment of the polymer and fabric.

DETAILED DESCRIPTION OF THE INVENTION

Figure 1:
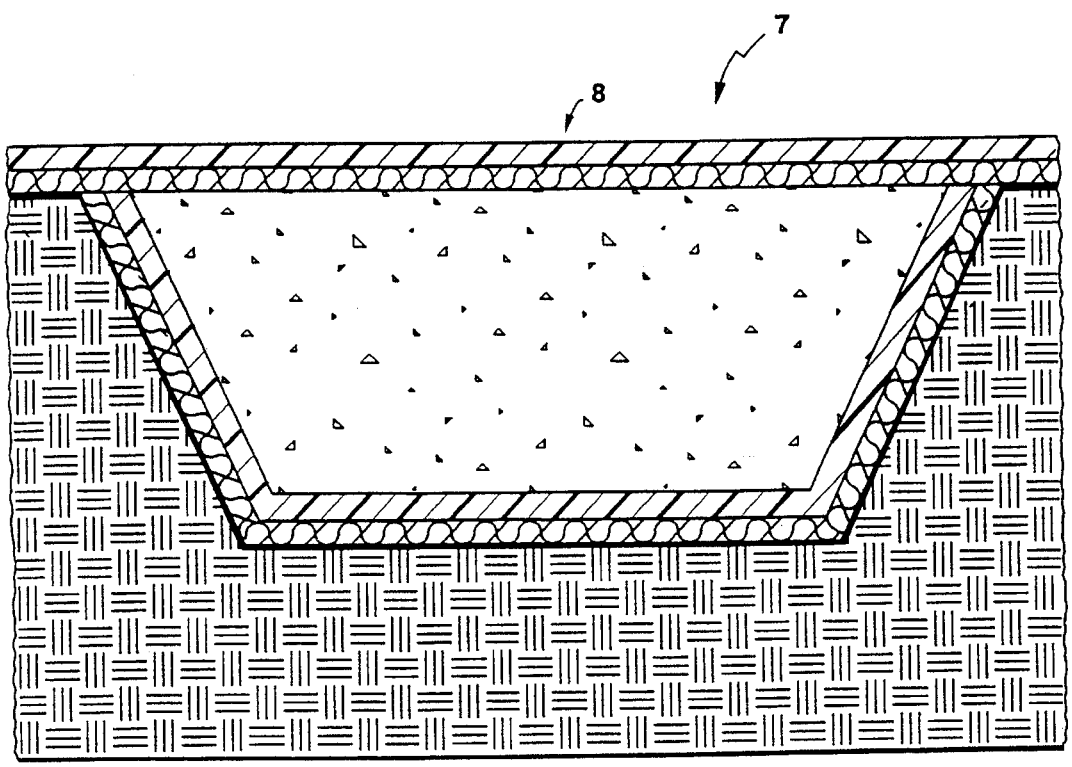
FIG. 1 is a schematic representation of a section through an excavated containment site.

There are numerous applications for the continuous polymer and fabric composite as described in the background of the present invention and known to those skilled in the art. FIG. 1 shows a field application for a containment area. The continuous composite is manufactured at the factory and transported to the site for installation. Containment area 7 such as a landfill is lined by continuous composite 8. As shown in FIG. 1 there may be a cover 9 made of the continuous composite over the containment area.

Figure 2:
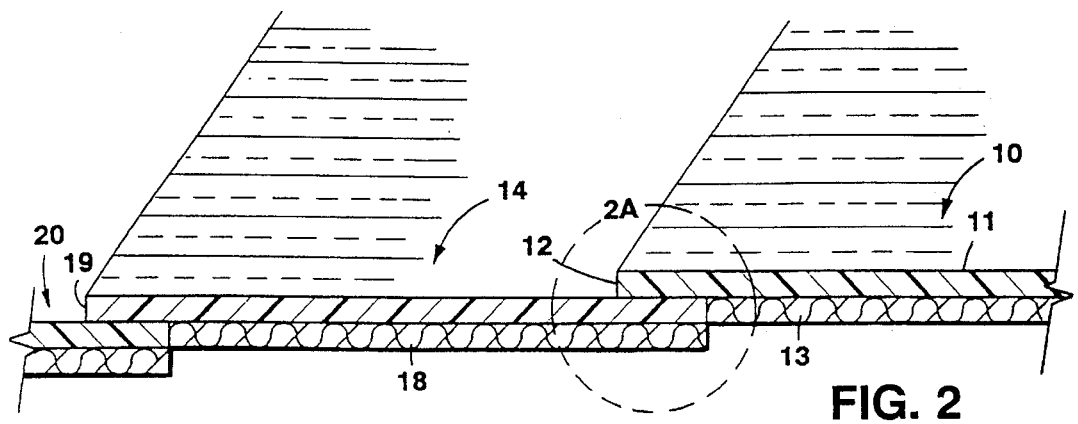
FIG. 2 is a schematic of the continuous polymer and fabric composite.

In FIG. 2 is an example of the fabricated composite. The fabric backed polymer sheet 10 is composed of a polymer sheet 11 and fabric layer 13. The main components of the composite are the polymer and fabric. The polymer sheet is of sufficient thickness to provide the properties desired for the application such as liquid and gas impermeability, chemical resistance, puncture resistance and other strength properties. The polymer must also have the characteristics needed for attachment to other polymer layers to provide a strong seal.

A number of polymers can be used in the manufacture of the composite. The following general categories of olefin hydrocarbon based polymers can be used including polyethylene, polypropylene, higher olefin based polymers, copolymers of olefins substituted with ethylene, propylene, butene, and higher olefins, copolymers with vinyl esters and acrylic based materials, copolymers with carboxyl containing monomers, natural rubber and polyisoprene, butadiene rubber, copolymers of butadiene with polystyrene and polyacrylonitrile, butyl rubber, chlorobutyl rubber, chlorosulfonated polyethylene rubber. Also, substituted ethylenic polymers can be used including polystyrene, copolymers with polybutadiene, acrylonitrile and methyl methacrylate, rubber modified polystyrene, acrylic polymers, polyvinyl esters, derived polyvinyl esters, chlorine substituted ethylene, copolymers of vinyl chlorides with vinyl esters, fluorine and fluorochlorine containing polymers. In addition, heterochain thermoplastics can be used including polyamides and polypeptides, polyesters, polyethers, polyurethanes, polycarbonates, polysulfide polymers, cellulose derivative polymers, polyimides, polyphenylene oxide, polyarylate and ketones. Thermosetting polymers including phenol-aldehyde condensation products, urea-formaldehyde and melamine formaldehyde products, unsaturated polyester resins, epoxy resins, polyurethanes, silicones, alkyd polymers, allyl polymers, and diallyl phthalate polymers can be used. It is not intended to limit the use of any type of polymer that has the characteristics described generally herein. Also, mixtures of different polymers can be used.

Additives to enhance the properties of the polymer sheet or plies of a multiply laminate polymer sheet may be used. Additives known to those skilled in the art include fire and flame retardants, colorants and pigments, ultraviolet absorbers and stabilizers, biocides, fillers, extenders, anti-oxidants, vulcanizer and impact modifiers. The polymer membrane can range in thickness from about 5 to about 100 mil, depending on the application.

The fabric can be a textile made from synthetic fiber forming polymers, naturally occurring fibers and mixtures thereof. Synthetic fibers can be made from the group consisting of polyolefins and copolymers, polyvinyls, polyesters, polyamides, polurethanes, polyacrylonitrile, polyvinyl alcohol, and viscose rayon. Natural fibers used for fabrics can include jute, hemp, cotton and wool. These fibers can be used in physically mixed or constituent mixed systems.

Examples of woven materials include a scrim made from polyethylene, polypropylene, nylon or polyester. The nonwoven materials may comprise, for example, fibers of polyethylene, polypropylene and polyethylene terepthalate and other fiber forming polymers either continuous spun bond or needled punched. Fiber properties can be enhanced using additives known to those in the art including fire retardants, colorants, ultra violet absorbers and stabilizers and antioxidants. Geotextiles used for composite applications are known to those skilled in the art. The invention is not intended to be limited to any type of fabric.

FIG. 2 is a cross-section through several fabric backed polymer sheets attached according to the method of this invention. As an example shown in one of the sheets the fabric layer 13 is firmly attached to polymer sheet 11 providing a strong bond between the polymer and fabric backing. Fabric layer 13 covers substantially one side of polymer sheet 11 leaving a strip of polymer along one edge not backed by the fabric. The strip provides a polymer lip 12 on polymer sheet 11 which is used to attach to another fabric backed polymer sheet 14. Polymer sheet 14 is constructed in a similar fashion to polymer sheet 10 and has a polymer sheet 16 and fabric backing 18 and a polymer lip 19 for attachment to adjacent sheet 20. Sheets can be attached to adjacent sheets in a similar manner providing a continuous composite.

Figure 2A:
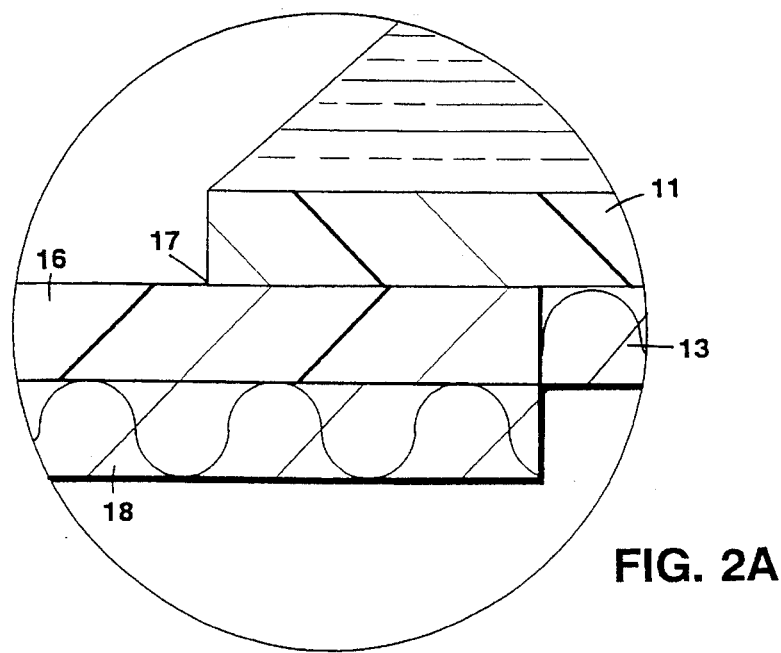

FIG. 2a is an enlargement of the point of attachment between fabric backed polymer sheet 10 and the adjacent fabric backed polymer sheet 14. Lip 12 overlaps the edge of polymer sheet 16 on the reverse side of fabric 18. Polymer sheets 11 and 16 are attached at seal 17. The fabricated seal 17 is uniform, continuous, impermeable with strength equal to roughly the strength of the plastic sheeting. The multiple sheets 10, 14, 20 and 22 are attached to each other to form a large continuous composite sheet. Additional sheets may be used as desired.

Figure 3:
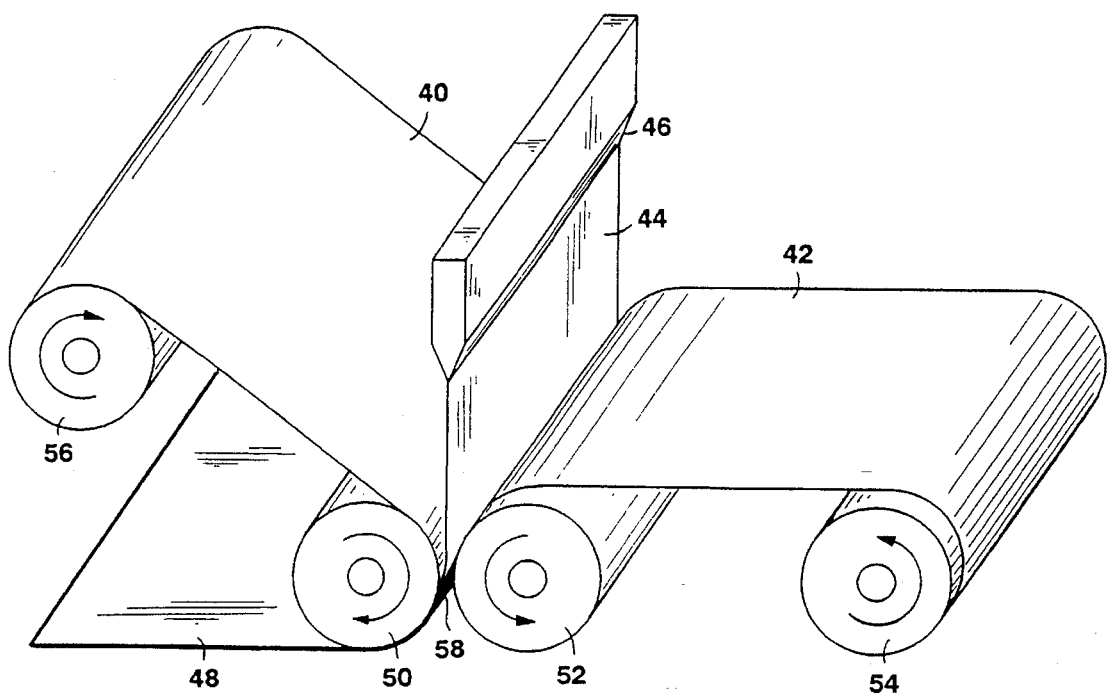
FIG. 3 is a schematic of a manufacturing setup to make a preferred embodiment of the fabric backed polymer sheets.

The following steps are a preferred method to obtain the continuous composite of this invention. FIG. 3 depicts a lamination setup. The polymer sheeting 40 and fabric 42 are laminated together using a high temperature coat of a suitable tie layer resin 44, which is pumped through a polymer die 46. The typical properties of a tie layer material are good adhesion to substrates, good temperature resistance and good flow properties. The typical temperature of this coat normally ranges from 530°–630° F. More typically the temperature ranges from 550°–600° F. The polymer type for tie layer resin 44 may differ, depending upon the type of properties desired. Specific grades in polyethylene and co-polymers, polypropylene and co-polymers can be used as a resin for attaching the polymer sheet and fabric together. The polyethylenes can be a low density polyethylene or a linear low density or a high density polyethylene or mixtures thereof. The polypropylenes used normally are co or ter polymers of polypropylene with ethylene or olefin monomers. An acrylic polymer, for example, an alkyl acrylate such as an ethyl or methyl acrylate comprising between 10–30% acrylate monomer can be used. A vinyl acetate co-polymer especially ethylene vinyl acetate comprising between 10–30% of vinyl acetate monomer may be used. The tie layer resins can also be used in mixtures with each other. Operating temperatures can be lowered when using acrylate and acetate co-polymers. The width of the composite 48 depends on the capabilities of the raw material and the equipment. The equipment typically used has a width from 50 to 150 inches. The rolls 50 and 52 pressure the polymer sheet 40 and fabric 42 together with tie layer resin 44 to achieve a good level of adhesion of the polymer sheeting to the fabric. Similar laminations can be achieved by using a hot melt adhesive or pressure sensitive adhesive as a tie layer. Hot melt adhesives include low melting polymers including rubbers, polyolefins, acrylic and acetate co-polymers. Pressure sensitive adhesives are typically dispersions of rubbers, acrylics and acetates in water or solvent. Application techniques can be similar to the methods described herein or could be achieved by coating rolls as known to those skilled in the art. The lip overhang 58 is obtained by accurately calculating the spacing of an index guide on the primary unwind 54, which carries the fabric, relative to the polymer sheet which is kept stationary on the secondary unwind 56. The same adjustments could be done with the polymer sheeting on the primary unwind 54 and the fabric on the secondary unwind 56.

FIG. 4 shows the preferred embodiment laminate 60 with the fabric backing 62 attached with tie resin layer 68 to the polymer sheeting 64 with the polymer lip overhang 66. The width of the plastic lip 66 usually ranges from about 1–3 inches, with preferably a lip of 2 inches in the composite product. A lip of more than 3 inches can be inefficient and not necessary in forming a strong attachment with respect to material usage. The thickness of the polymer sheeting 64 is important in the design of the product. Typical polymer Sheeting can vary from about 5 to about 100 mil. A sufficient thickness of the polymer sheeting 64 is necessary to provide a heat seal strong sufficient to withstand the weight of the material in addition to the other forces encountered during usage. The amount of tie resin 68 used to attach the fabric 62 and the polymer sheeting 64 together is important to obtain a significant level of adhesion between the two layers to form a strong composite.

FIG. 5 shows an alternative embodiment with fabric backing on both sides of the polymer sheet which can also be manufactured using the lip overhang technique discussed above. Each separate sheet consists of a polymer sheet and two fabric layers.

FIG. 5 shows 3 sheets that have been attached to form a continuous composite. Polymer sheet 70 has one fabric layer 72 covering substantially one side of the polymer sheet leaving a strip 76 of polymer along the edge not backed by the fabric. A second fabric layer 74 is attached to the polymer sheet on the reverse side to the first fabric layer 72 substantially covering the reverse side leaving a strip 78 along the edge not backed by the second fabric layer. This construction forms double fabric backed polymer sheet 80 that has two strips of polymer 76 and 78 backed on one side with fabric. Double fabric backed polymer sheets 82 and 84 are similarly constructed. The double fabric backed sheets are attached by aligning the polymer strips on separate sheets facing each other and sealing.

Both strips 76 and 78 are shown in FIG. 5 facing similar strips on sheets 82 and 84 to form a continuous composite with fabric on both sides. This is a high performance composite and can find applications in areas similar to those discussed above, but is particularly suitable where extremely high impact and puncture resistance is required. Various other combinations and composites can be formed using the above invention by those skilled in the art.

A preferred method for manufacturing the alternative embodiment shown in FIG. 5 utilizes the lamination set up shown in FIG. 3. After one fabric layer has been attached preferably with a tie layer to a polymer sheet leaving a lip for attachment, a second fabric layer is attached on the reverse side. The second fabric layer substantially covers the reverse side of the polymer sheet except for an edge of the polymer sheet. The second fabric layer can be attached by the method described herein or other methods known to those skilled in the art. In the alternate embodiment strips of unbacked polymer are preferably on edges opposite to each other on the polymer sheet. The strips of polymer are aligned facing each other and sealed preferably by heat seaming. The double fabric backed embodiment of this invention can be made with the preselected number polymer sheets to form a continuous composite of the desired size. In some cases more than one edge on each side of the polymer sheet may need to remain unbacked to provide more than one polymer strip for attachment to additional sheets.

A preferred method of attachment in preparing the continuous composite is heat seaming. The integrity of the seams made to create the continuous composite are important to the success of any geocomposite construction. In the heat seaming process polymer molecules at the surface of the two polymer sheets being attached are thoroughly intermixed on a molecular scale. This is achieved by a proper combination of temperature, pressure dwell time and cooling during which there is an interdiffusion of the mobile molecules on both sides of the interface. A major consideration in the design of the lip technique for the use in composite systems is that the design function of the composite is transferred through the seam. The design function includes impermeability, transmissivity or of liquids or gases, bedding or cushioning, hydraulic barriers and load transfer.

A preferred heat seaming technique for the composite is by electrical resistance heating using a heating bar, which can vary from 1–50 ft in length. The two ends of the composite are coupled to each other as described earlier and the heating bar automatically lowered to achieve a heat seal. The material is held together under pressure on the heat bar and the dwell time controlled accurately to obtain a strong impermeable seal. In the case of the fabric on both sides of the sheet, the heat is transmitted through the fabric to seal the two polymer sheets. The choice of fabric is very important while using such a seal. A low melting fabric will destroy the functionality of the composite as compared to a high melting fabric such as a nylon or a polyester. Also, the amount of heat supplied in the double fabric layered composite is much high than that for the single layered composite. The seaming can be done continuously in the factory and sheets connected together to form a continuous composite of 40,000 ft$^2$ or more in area.

The above developed factory sealing technique has substantial advantages over the field installed seams. Manufacturing under pre-established conditions results in a better control of the quality and aesthetics of the panel. Large panels can be made with complete uniformity over the whole area of the panel. The rate of production is much faster due to factory automation at all steps of handling and seaming also resulting in long consistent runs. Ambient temperature control in the factory, uniform packaging, controlled sheet alignment are among the other advantages. The advantages over the field seaming techniques include—no ambient temperature variation from day to day—job to job, the amount of wind on field installation is not a factor, the skill of the seaming crew critical in field seaming operations is not important, proper preparation and cleaning of composite surfaces in nonexistent because of the clean factory environment.

The following examples are provided to illustrate in detail the materials, methods and techniques of this invention. A brief description on the examples are given below.

Example 1 is relatively light geomembrane laminated to a relatively light polypropylene nonwoven geotextile. The increase in physical properties of the composite and the overlap seam were compared.

Example 2 is a relatively heavy geomembrane laminated to a relatively heavier polyester nonwoven geotextile. The increase in physical properties of the composite and the overlap seam were compared.

Example 3 are the results of the various seaming techniques used on samples from Example 2.

EXAMPLE 1

In this example a light weight nonwoven geotextile about 4.5 oz/yd$^2$ made from staple polypropylene fibers was laminated to a relatively light flexible geomembrane. The geomembrane was Permalon® X150 a 4.1 oz/yd$^2$ (nonwoven fabric units used for convenience of comparison) geomembrane 9 mil thick made from polyethylene. The index guide for the nonwoven fabric was adjusted for a lip distance of about 2.5–about 2.0 inch and material checked for the exact distance. The lamination was done on a extrusion laminator. The temperatures in the extruder and die were maintained at 310° C. and rpm of the screw adjusted so that a tie layer of between 1–3 mil was obtained. The composite was tested for its physical properties listed in Table 1 below.

TABLE 1

| Material Property (ASTM) | Light Geomembrane Permalon® X150 | Light Geomembrane/ Light Geotextile Composite |
|---|---|---|
| Grab tensile strength @ break (lbf) ASTM D-4632 MD/TD | 92/74 | 124/151 |
| Puncture resistance (lbf) ASTM 3-4833 | 20 | 87 |
| Impact strength (lbm) ASTM D-1709 | 1.0 | 2.5 |
| Mullen Burst (psi) ASTM D-3786 | 69 (deform) | 265 |

The property of the composite approximate that of a 30–40 mil thick polyethylene membrane. The weight of the composite is 10.24 oz/yd$^2$ as compared to 30 oz/yd$^2$ for a 40 mil thick membrane. This composite was laminated using a hot sealing bar with the overlapping as discussed above. The heat was applied to seal the two geomembrane surfaces to each other, and the overlapping is achieved so that functionally the geotextile is continuous over the whole width of the seal. The seal for this composite is about 45 lbf in shear tested according to ASTM D-4545. This seal strength is sufficient for the relatively lower strength applications for the composition.

EXAMPLE 2

In this example a medium weight nonwoven fabric about 6 oz/yd$^2$ made from continuous spunbond polyester geotextile was laminated to a heavier flexible geomembrane. The geomembrane was Permalon® -X210, a 10 oz/yd$^2$ (nonwoven fabrics units used for convenience of comparison), made from polyethylene. As in Example 1 the index guide was adjusted for a lip distance of between 2.0 and 2.5 inch. The process conditions were maintained the same as in Example 1. The composite properties were tested and a comparison is shown below in Table 2.

TABLE 2

| Material Property (ASTM) | Geomembrane Permalon® X210 | Geomembrane/ Geotextile Composite |
| --- | --- | --- |
| Grab tensile strength @ break (lbf) ASTM D-4632 MD/TD | 179/175 | 346/329 |
| Puncture resistance (lbf) ASTM 3-4833 | 42 | 135 |
| Impact strength (lbm) ASTM D-1709 | 3.6 | 14.0 |
| Mullen Burst (psi) ASTM D-3786 | 150 (deform) | 392 |

The properties of the composite approximate that of a 50–60 mil thick polyethylene membrane. The weight of the composite is 16.6 oz/yd$^2$ for a similar geomembrane. The composite may be laminated together to form a continuous sheeting of any given size as large as 40,000 ft$^2$. The technique for heat sealing and concepts are similar to those discussed above. The seal strength of the composite as tested according to ASTM D-4545 is 96 lbf in shear. This is an extremely strong seal and is close to the yield strength of the material.

EXAMPLE 3

This example illustrates the various seaming techniques for the formation of an uninterrupted composite sheets for ready installation. Although the techniques discussed in the example are related to heat sealing or heat seaming techniques, there are other alternatives. Various other techniques including ultrasonic seaming, factory solvent seaming, electrical conduction seaming, electro magnetic induction seaming that can also be used to practice this invention.

The most common heat sealing technique is the electrical resistance heating of an iron bar which is applied on the polymer or the polymer moved along the bar to give the appropriate adhesion and sealing strength. The voltage applied can be varied from 0–480 volts, the voltage normally used is in the range of 275–300 V. The amperage is normally between 150–170 amps. The time of heat sealing for an appropriate voltage is an important variable when heat sealing different materials. The rate of cooling is important for proper recrystallization of the polymer and also to prevent the material from sticking. A 30 sec cool at 55° F. is normally sufficient to achieve proper recrystallization. The seaming is normally carried out with the heat on the geomembrane side, however a higher voltage can be used to seam through the continuous needle punched polyester geotextile. The Table 3 below shows the seam strengths on the composite materials described in Example 2 obtained through various heat seaming techniques.

TABLE 3

| Method | Seam Shear Strength | Conditions |
| --- | --- | --- |
| Heat bar - geomembrane heat | 96 lbf | 300 V, 26 sec heat |
| Heat bar - geotextile heat | 120 lbf | 400 V, 26 sec heat |
| Continuous feed - heat bar | 87 lbf | 440° F., 31.2 ft/min |
| Continuous feet - heat bar | 70 lbf | 440° F., 32.5 ft/min |
| Hot air welder | 97 lbf | 1000° F. |

The materials described in Examples 1 and 2 can be used to prepare a geocomposite. However the same or similar materials can be used to prepare a composition for other applications described herein. The examples described herein are not intended to limit the scope of the invention generally disclosed.

We claim:

1. A method for making a polymer and fabric composite comprising the steps of:
   (a) attaching a layer of fabric to a polymer sheet covering substantially one side of the polymer sheet to form a fabric backing leaving at least one strip of polymer along one edge not backed by the fabric layer forming a polymer lip;
   (b) attaching a layer of fabric to a second polymer sheet covering substantially one side of the second polymer sheet with a fabric backing leaving at least one strip of polymer along one edge not backed by the fabric layer forming a polymer lip;
   (c) sealing the polymer lip of the first polymer sheet to the second polymer sheet on the reverse side of the fabric layer and to edge opposite to the lip of the second sheet;
   (d) preparing additional polymer sheets backed by fabric as described in steps (a) and (b); and
   (e) sealing the selected number of fabric backed polymer sheets as described in step (c) to prepare the desired size of the continuous composite.

2. A method of manufacturing a polymer and fabric composite of claim 1 wherein the fabric layer is attached by the step of laminating the fabric to the polymer selected from the group consisting of hot melt adhesives or a pressure sensitive adhesives.

3. A method of manufacturing a polymer and fabric composite of claim 1 wherein the sealing in step (c) is heat sealing.

4. A method for making a polymer and fabric composite comprising the steps of:
   (a) attaching a layer of fabric to a polymer sheet covering substantially one side of the polymer sheet with a fabric backing leaving a first strip of polymer along one edge not backed by the fabric;
   (b) attaching a second layer of fabric to the polymer sheet on the reverse side of the polymer sheet covered in step (a) substantially covering the reverse side with a fabric backing leaving one strip of polymer alone one edge not backed by the second fabric said strip of polymer on an edge of the sheet other than the first strip of polymer;
   (c) preparing a preselected number of double fabric backed polymer sheets as described in steps (a) and (b);
   (d) sealing one double backed polymer sheet to another double backed polymer sheet whereby the strips of polymer on each of the polymer sheets are aligned facing each other; and
   (e) additionally sealing the selected number of double fabric backed polymer sheets as described in step (d) to prepare the desired size of the continuous composite.

5. A method of manufacturing a polymer and fabric composite of claim 4 wherein the fabric layer is attached by the step of laminating the fabric to the polymer with a tie resin layer.

6. A method of manufacturing a polymer and fabric composite of claim 4 wherein the sealing in step (c) is heat sealing.

\* \* \* \* \*